United States Patent [19]

Hatanaka et al.

[11] Patent Number: 5,405,889

[45] Date of Patent: Apr. 11, 1995

[54] ROOM-TEMPERATURE-CURABLE ORGANOPOLYSILOXANE COMPOSITION

[75] Inventors: Hidekatsu Hatanaka, Chiba; Noriyuki Suganuma, Fukui, both of Japan

[73] Assignee: Dow Corning Toray Silicone Co., Ltd., Tokyo, Japan

[21] Appl. No.: 24,146

[22] Filed: Mar. 1, 1993

Related U.S. Application Data

[63] Continuation-in-part of Ser. No. 963,495, Oct. 19, 1992, abandoned.

[30] Foreign Application Priority Data

Oct. 31, 1991 [JP] Japan .................. 3-355403

[51] Int. Cl.$^6$ .................. C08K 9/10; C08K 5/05; C08L 93/00; C08L 83/04
[52] U.S. Cl. .................. 523/210; 524/764; 524/863; 524/788; 524/766; 524/864
[58] Field of Search .................. 523/210; 524/764, 863, 524/788, 766, 864

[56] References Cited

U.S. PATENT DOCUMENTS

| | | | |
|---|---|---|---|
| 3,542,714 | 11/1970 | Metters | 260/24 |
| 3,837,876 | 9/1974 | Mayuzumi et al. | 106/287 SB |
| 3,872,043 | 3/1975 | Branlard et al. | 524/764 |
| 3,925,283 | 12/1975 | Dahl | 524/764 |
| 4,447,354 | 5/1984 | Scharrer et al. | 524/764 |
| 4,491,655 | 1/1985 | Sandstrom | 524/764 |
| 4,602,078 | 7/1986 | Joseph et al. | 528/34 |
| 4,626,475 | 12/1986 | Goel et al. | 524/764 |
| 4,855,335 | 8/1989 | Neperud | 524/271 |
| 4,962,151 | 10/1990 | Mellon | 524/588 |
| 4,975,477 | 12/1990 | Cox et al. | 524/764 |
| 5,051,455 | 9/1991 | Chu et al. | 524/788 |
| 5,134,182 | 7/1992 | Chu | 524/140 |
| 5,183,841 | 2/1993 | Bernard | 524/560 |

FOREIGN PATENT DOCUMENTS

2065152 6/1981 United Kingdom .

OTHER PUBLICATIONS

Chemical Abstracts, vol. 115, No. 2, 15 Jul. 1991, Fujimota et al, p. 125, column L.
JP01163281 Abstract.

*Primary Examiner*—Melvyn I. Marquis
*Assistant Examiner*—Karen Arlene Dean
*Attorney, Agent, or Firm*—Roger H. Borrousch

[57] ABSTRACT

A room-temperature-curable organopolysiloxane composition having a highly durable adhesion that bonds well to various substrates, e.g. glass, plastics, and metals, through contact-curing and exhibits an excellent early-cure adhesiveness and that cures to give a silicone rubber that is highly water-resistant and exhibits long-term retention of its bonding strength even in hostile ambients, e.g. immersion in hot water, comprises a composition of a hydroxyl-terminated or alkoxy-terminated organopolysiloxane, an inorganic filler, a rosin ester in which the ester is a polyol, a reaction mixture from aminoalkylalkoxysilane and epoxyalkylalkoxysilane, and a curing catalyst.

20 Claims, No Drawings

ROOM-TEMPERATURE-CURABLE ORGANOPOLYSILOXANE COMPOSITION

This is a continuation-in-part of application Ser. No. 07/963,495, filed on Oct. 19, 1992, now abandoned.

BACKGROUND OF THE INVENTION

1. Field of the Invention

The present invention relates to a room-temperature-curable organopolysiloxane composition. More specifically, the present invention relates to a room-temperature-curable organopolysiloxane composition that develops a strong adhesion for a variety of substrates, e.g., glass, plastics, metals, and so forth, when cured while in contact with the substrate (contact-curing) and, moreover, that develops this adhesion at an early stage in its cure, wherein this adhesion is highly durable to challenge by hostile ambients, e.g., immersion in hot water and so forth.

2. Background Information

Mayuzumi et al in U.S. Pat. No. 3,837,876, issued Sep. 24, 1974, and Joseph et al in U.S. Pat. No. 4,602,078, issued Jul. 22, 1986, teach organopolysiloxane compositions that are adhesive for a variety of substrates through contact-curing. These compositions consist of hydroxyl-endblocked organopolysiloxane, aminoalkylalkoxysilane/epoxyalkylalkoxysilane mixture or reaction product, and curing catalyst. However, the adherence of the silicone rubbers afforded by the cure of these compositions deteriorates upon exposure to water. In particular, their bonding strength for float glass deteriorates during challenge by hostile ambients, such as immersion in hot water and the like.

Matters in U. S. Pat. No. 3,542,71, issued Nov. 24, 1970, teaches a composition consisting essentially of dimethylpolysiloxane and 0.5 to 10 percent by weight of rosin. These compositions are reported to be paintable. Metters also teaches that the rosin includes unmodified rosin, modified rosin, and rosin derivatives. The rosin derivatives include derivatives made by removal of or reaction with the carboxyl group of abletic acid, such as hydrogenolysis, aminolysis, decarboxylation, and esterification which produces abietic acid esters. Matters teaches that the dimethylsiloxane elastomers can be any kind including those cured by radiation, by the action of heat sensitive curing agents such as peroxides, sulfur, or other free radical generators, by urea or cyanoguanidine, by curing at room temperature by the action of moisture and metal salts of carboxylic acids such as head, manganese, tin, and iron or titanium esters such as butyl titanate, with reactive crosslinking agents such as SiH containing compounds, acyloxy silanes, oxime silanes or alkoxy silanes, and by curing with the reaction of SiH siloxanes and alkenyl substituted siloxanes in the presence of a platinum catalyst.

SUMMARY OF THE INVENTION

The present inventors carried out extensive investigations directed at solving the above-described problems. As a result, they discovered that a highly durable adhesion could be obtained from a room-temperature-curable organopolysiloxane composition that contained an aminoalkylalkoxysilane/epoxyalkylalkoxysilane reaction mixture and resin acid including rosin. However, it was found that during the early stage of its cure this composition is slow to develop adhesive strength for certain substrates. Accordingly, the inventors continued their investigations and were able to achieve the present invention as a result.

The present invention takes as its object the introduction of a room-temperature-curable organopolysiloxane composition having a highly durable adhesion that develops an excellent early-cure adhesiveness for a variety of substrates, e.g., glass, plastics, and metals, by contact-curing and that cures to afford a highly water-resistant silicone rubber that manifests a long-term retention of its bonding strength even when challenged by a hostile ambient, e.g., hot-water immersion.

This invention relates to a room-temperature-curable organopolysiloxane composition comprising (A) 100 parts by weight of hydroxyl-endblocked or alkoxy-endblocked organopolysiloxane that has a viscosity at 25° C. within the range of 0.000020 to 1 $m^2/s$, (B) 1 to 300 parts by weight inorganic filler, (C) 0.1 to 10parts by weight rosin ester which is an esterification product of rosin and a polyol, (D) 0.5 to 30 parts by weight reaction mixture from aminoalkylalkoxysilane and epoxyalkylalkoxysilane, and (E) 0.001 to 10 parts by weight curing catalyst.

DESCRIPTION OF THE PREFERRED EMBODIMENTS

The organopolysiloxane of the component (A) used in the present invention is the main or base component of the composition. The organopolysiloxane must be endblocked by hydroxyl groups or alkoxy groups. When its viscosity is too low, the post-cure rubber elasticity will be poor. On the other hand, the processability is impaired when its viscosity is too high. For these reasons, its viscosity at 25° C. must fall within the range of 0.000020 to 1 $m^2/s$ (square meters per second), while the preferred viscosity range is 0.0001 to 0. 1 $m^2/s$. This organopolysiloxane preferably has a straight-chain molecular structure, but a moderately branched chain is also usable.

The organic groups in this organopolysiloxane are exemplified by alkyl groups such as methyl, ethyl, propyl, butyl, and octyl; alkenyl groups such as vinyl, allyl, and hexenyl; aryl groups such as phenyl and tolyl; and substituted alkyl groups such as 3,3,3-trifluoropropyl, 3-chloropropyl, and 3-cyanoalkyl. The organopolysiloxane under consideration is specifically exemplified by dimethylpolysiloxanes, methylethylpolysiloxanes, methyloctylpolysiloxanes, methylvinylpolysiloxanes, methylphenylpolysiloxanes, methyl (3,3,3-trifluoropropyl))polysiloxanes, dimethylsiloxane-methylphenylsiloxane copolymers, and dimethylsiloxane-methyl(3,3,3-trifluoropropyl)siloxane copolymers. The hydroxyl-endblocked molecular chain terminals are preferably dimethylhydroxysiloxy and methylphenylhydroxysiloxy. The alkoxy-endblocked molecular chain terminals are preferably vinyldimethoxysiloxy, methyldimethoxysiloxy, trimethoxysiloxy, methyldiethoxysiloxy, and triethoxysiloxy.

The inorganic filler of the component (B) employed by the present invention functions to thicken the composition and to provide the cured product therefrom with mechanical strength. This inorganic filler is exemplified by alkaline-earth metal salts, inorganic oxides, metal hydroxides, and carbon black. The alkaline-earth metal salts are specifically exemplified by the carbonates, bicarbonates, sulfates, etc., of calcium, magnesium, and barium. The inorganic oxides are specifically exemplified by fumed silica, calcined silica, precipitated silica, microparticulate quartz, titanium oxide, diatomaceous earth, alumina, and the like. The metal hydroxides are specifically exemplified by aluminum hydroxide. These fillers may also be used after surface treatment with a silane, silazane, low degree-of-polymerization siloxane, or an organic compound.

Among the preceding inorganic fillers, fumed silica, precipitated silica, and colloidal calcium carbonate are preferred when higher mechanical strengths are desired for the cured product.

Component (B) i s added at 1 to 300 parts by weight per 100 parts by weight component (A). Component (B) may take the form of a single species of inorganic filler or any desired mixture of the preceding. The cured product obtained from the composition under consideration will have a poor mechanical strength at a component (B) addition of less than 1 part by weight. On the other hand, when the component (B) addition exceeds 300 parts by weight, it becomes highly problematic to produce a cured product having a good rubber elasticity.

The rosin ester of the component (C) employed by the present invention, through its joint use with component (D), functions to provide the cured product obtain from the inventive composition with adhesiveness in hostile ambients, e.g. immersion in hot water, without impairing the early-cure development of adhesiveness. This rosin ester is the product obtained by the alcohol esterification of rosin. Rosin is the turpentine oil-free nonvolatile component obtained from the steam distillation of the resin from coniferous trees, such as pine and so forth. The alcohol used in this esterification is a polyol having two or more C-OH groups per molecule, for example, ethylene glycol, glycerol, and pentaerythritol. Although rosin typically contains 2 double bonds, there is no impediment to the use of ester compounds deriving from modified rosin that has been modified by disproportionation, dimerization, or hydrogenation.

Component (C) should be added at 0.1 to 10 parts by weight per 100 parts by weight component (A), preferably from 0.5 to 5 parts by weight. A satisfactorily durable adhesion is not developed at an addition below 0.1 weight parts, while additions in excess of 10 parts by weight cause a slow curing rate and a diminished post-cure rubber strength.

Component (D) comprises the reaction mixture from aminoalkylalkoxysilane and epoxyalkylalkoxysilane. This component functions as a crosslinker for the composition and also serves to impart the capacity to adhere to various types of substrates by contact-curing. In addition, component (D), through its joint use with component (C), provides the cured product from the invention composition with an adherence that is durable to hostile ambients, e.g. immersion in hot water.

The aminoalkylalkoxysilane making up component (D) is exemplified by aminomethyltriethoxysilane, gamma-aminopropyltriethoxysilane, gamma-aminopropylmethyldimethoxysilane, N-(beta-aminoethyl)aminomethyltributoxysilane, N-(beta-aminoethyl)-gamma-aminopropyltrimethoxysilane, N-(beta-aminoethyl)-gamma-aminopropylmethyldimethoxysilane, and gamma-anilinopropyltriethoxysilane.

The epoxyalkylalkoxysilane making up this component (D) is exemplified by gamma-glycidoxypropyltrimethoxysilane, gamma-glycidoxypropylmethyldimethoxysilane, beta-(3,4-epoxycyclohexyl)ethyltrimethoxysilane, and beta-(3,4-epoxycyclohexyl)ethylmethyldimethoxysilane.

The reaction mixture is prepared simply by mixing the aminoalkylalkoxysilane and epoxyalkylalkoxysilane at a molar ratio in the range of (1:1.5) to (1:5) and preferably (1:2) to (1:4) and heating or holding at room temperature.

Component (D) should be added at 0.5 to 30 parts by weight per 100 parts by weight component (A) and is preferably added at 1 to 10 parts by weight per 100 parts by weight component (A). The basis for this range is as follows: an adequate rubber strength and adhesiveness are not obtained when less component (D) is present; on the other hand, when more is present, the curing rate is diminished and the cured rubber is too hard.

The curing catalyst of component (E) functions as a catalyst to accelerate the cure of the composition according to the present invention. Component (E) is exemplified by the carboxylic acid salts of tin, titanium, zirconium, iron, antimony, bismuth, and manganese, and by organotitanate esters and organotitanium chelate compounds. Operative catalysts are specifically exemplified by tin compounds such as dibutyltin dilaurate, dibutyltin dioctoate, dioctyltin dilaurate, dibutyltin malate ester, and stannous octoate, and by titanium compounds such as tetrabutyl titanate, diisopropoxybis(acetylacetonate)titanium, and diisopropoxybis(ethyl acetoacetate)titanium.

Component (E) should be added at 0.001 to 10 parts by weight per 100 parts by weight component (A) and is preferably added at 0.01 to 5 parts by weight per 100 parts by weight component (A) . The basis for this range is as follows: when less than 0.001 part by weight of component (E) is present, the curing rate is so slow that practical use is precluded; the presence of more than 10 parts by weight of component (E) causes such a high curing rate that the use time is eliminated.

In order to adjust the curability and post-cure rubber strength of the composition according to the present invention, it may additionally contain (F) an alkoxysilane crosslinker different from component (D). This alkoxysilane is exemplified by tetrafunctional alkoxysilanes such as tetramethoxysilane, tetraethoxysilane, methyl Cellosolve orthosilicate, and n-propyl orthosilicate; by trifunctional alkoxysilanes such as methyltrimethoxysilane, methyltriethoxysilane, ethyltrimethoxysilane, vinyltrimethoxysilane, phenyltrimethoxysilane, and methyltri(methoxyethoxy)silane; and by the partial hydrolyzates of the preceding. The alkoxysilane crosslinker is preferably added in an amount of from 1 to 10 parts by weight based on 100 parts by weight of (A).

In addition, the composition according to the present invention may contain the following on an optional basis insofar as the object of the present invention is not impaired: organic solvent, trimethylsiloxy-terminated diorganopolysiloxane, flame retardant, plasticizer, thixotropy agent, colorant, ordinary adhesion promoters, and antimolds.

The present invention is explained in greater detail below through illustrative examples. In the examples and comparison examples, parts designates parts by weight, the viscosity is the value at 25° C., and the following abbreviations are used: Tmax=maximum tensile stress; Emax=elongation at maximum load; and CF ratio=cohesive failure ratio in the sample.

EXAMPLE 1

The following were mixed to homogeneity to afford a mixture hereinafter designated as the "base": 100 parts hydroxyl-endblocked polydimethylsiloxane with viscosity=0.015 m²/s, 100 parts fatty acid-treated calcium carbonate (average particle diameter=0.08 micrometers), and 2 parts ethylene glycol ester of rosin (viscosity=200 Pa.s).

The following were also mixed to afford a mixture hereinafter designated as the "catalyst": 60 parts n-propyl orthosilicate, 40 parts of the 1:2 molar ratio reaction mixture from gamma-aminopropyltriethoxysilane and gamma-glycidoxypropyltrimethoxysilane, and 1 part dibutyltin dilaurate.

The base and catalyst were then mixed at a 100:5 weight ratio to give a room-temperature-curable organopolysiloxane composition. Tensile adhesion test specimens were prepared based on JIS A 5758 using this composition. The adherends were float glass and high-performance heat-reflecting glass (SGY32 from Asahi Glass Kabushiki Kaisha). The tensile adhesion was measured after curing for 5 days at 20° C. In addition, the tensile adhesion was also measured after curing for 7 tion was evaluated as in Example 1, and these results were as reported in the Table 1.

COMPARISON EXAMPLE 1

A room-temperature-curable organopolysiloxane composition was prepared as in Example 1, but in the present case using 2.5 parts of a toluene solution of rosin (solids=80%) in place of the ethylene glycol ester of rosin used in Example 1. This composition was evaluated as in Example 1, and these results were as reported in the Table 1.

COMPARISON EXAMPLE 2

A room-temperature-curable organopolysiloxane composition was prepared as in Example 1, but in the present case omitting the ethylene glycol ester of rosin from the base of Example 1. This composition was evaluated as in Example 1, and these results were as reported in the Table 1.

TABLE 1

| Composition Number | Adherend | After cure for 5 days at 20° C. | | | Post-immersion in 80° C. water | | |
|---|---|---|---|---|---|---|---|
| | | Tmax kgf/cm² | Emax % | CF ratio % | Tmax kgf/cm² | Emax % | CF ratio % |
| Example 1 | float glass | 10.7 | 170 | 100 | 10.3 | 150 | 100 |
| | SGY32 | 10.6 | 160 | 100 | 11.1 | 160 | 100 |
| Example 2 | float glass | 10.2 | 160 | 100 | 10.9 | 150 | 100 |
| | SGY32 | 10.0 | 160 | 100 | 10.5 | 140 | 100 |
| Example 3 | float glass | 11.2 | 160 | 100 | 11.4 | 150 | 100 |
| | SGY32 | 10.5 | 150 | 100 | 10.4 | 140 | 100 |
| Example 4 | float glass | 10.9 | 160 | 100 | 10.3 | 140 | 100 |
| | SGY32 | 10.4 | 140 | 100 | 11.3 | 160 | 100 |
| Comparison Example 1 | float glass | 10.3 | 150 | 100 | 10.7 | 140 | 100 |
| | SGY32 | 5.6 | 50 | 10 | 10.6 | 150 | 100 |
| Comparison Example 2 | float glass | 10.0 | 160 | 100 | 6.6 | 90 | 40 |
| | SGY32 | 10.5 | 160 | 100 | 10.2 | 140 | 100 | days at 20° C. and then 7 days at 50° C. and then immersion for 1 month in hot water (80° C.). These measurement results are reported in the Table 1, respectively, in the columns labeled "after cure for 5 days at 20° C." and "post-immersion in 80° C. water".

EXAMPLE 2

A room-temperature-curable organopolysiloxane composition was prepared as in Example 1, but in the present case using 2.5 parts of a toluene solution (solids=80%) of glycerol ester of rosin (ester softening point=90° C.) in place of the ethylene glycol ester of rosin used in Example 1. This composition was evaluated as in Example 1, and these results were as reported in the Table 1.

EXAMPLE 3

A room-temperature-curable organopolysiloxane composition was prepared as in Example 1, but in the present case using 2.5 parts of a toluene solution (solids=80%) of pentaerythritol ester of rosin (ester softening point=120° C.) in place of the ethylene glycol ester of rosin used in Example 1. This composition was evaluated as in Example 1, and these results were as reported in the Table 1.

EXAMPLE 4

A room-temperature-curable organopolysiloxane composition was prepared as in Example 1, but in the present case using 2.5 parts of a toluene solution (solids=80%) of glycerol ester of hydrogenated rosin (ester softening point=90° C.) in place of the ethylene glycol ester of rosin used in Example 1. This composition

EXAMPLE 5

The following were mixed to homogeneity to afford a mixture hereinafter designated as the "base": 100 parts hydroxyl-endblocked polydimethylsiloxane with viscosity=0.015 m²/s, 100 parts fatty acid-treated calcium carbonate (average particle diameter=0.08 micrometers), and 2 parts diethylene glycol ester of abietic acid. The following were also mixed to afford a mixture hereinafter designated as the "catalyst": 60 parts n-propyl orthosilicate, 40 parts of the 1:2 molar ratio reaction mixture from gamma-aminopropyltriethoxysilane and gamma-glycidoxypropyltrimethoxysilane, and 1 part dibutyltin dilaurate.

The base and catalyst were then mixed at a 100:5 weight ratio to give a room temperature-curable organopoly-siloxane composition. The resulting product was then place in aluminum tubes.

The adhesion of this room temperature-curable organo-polysiloxane composition to high performance heat-reflecting glass (SGY 32 from Asahi Glass Kabushiki Kaisha, Japan) was then measured and the results obtained were as reported in Table 2. The room temperature-curable organopolysiloxane composition was extruded in bead-form (width 10 mm×length 40 mm×thickness 5 mm) on the glass substrate to make the test pieces which were then tested according to the adhesion test method described in Example 1. The room temperature-curable organopolysiloxane composition on the test pieces were allowed to cure by standing at 20° C. and 55% relative humidity. The adhesion was measured after 2 days, 4 days, and 7 days. In addition, the adhesion tested after curing for 7 days and then 3 days at 50° C. and then immersed in 80° C. water and the adhesion was tested after 7 days and 14 days. The obtained cured bead was pulled in order to separate it from the glass surface, the resulting peeled surface was examined, and the proportion of rupture of cured layer was reported as the percentage cohesive rupture. The percentage cohesive rupture was as is reported in Table 2.

COMPARISON EXAMPLE 3

A room temperature-curable organopolysiloxane composition was prepared as described in Example 5, but 2 parts of an isopropyl ester of abietic acid was used in place of the diethylene glycol ester of abietic acid. The adhesion was tested as described in Example 5 and the results were as reported in Table 2.

COMPARISON EXAMPLE 4

A room temperature-curable organopolysiloxane composition was prepared as described in Example 5, but 2 parts of abietic acid was used in place of the diethylene glycol ester of abietic acid. The adhesion was tested as described in Example 5 and the results were as reported in Table 12.

COMPARISON EXAMPLE 5

A room temperature-curable organopolysiloxane composition was prepared as described in Example 5, but the diethylene glycol ester of abietic acid was not used. The adhesion was tested as described in Example 5 and the results were as reported in Table 2.

TABLE 2

| TEST CONDITIONS | EXAMPLE 5 | COMPARISON EXAMPLE 3 | COMPARISON EXAMPLE 4 | COMPARISON EXAMPLE 5 |
|---|---|---|---|---|
| AFTER 2 DAYS AT 20° C. | 0 | 0 | 0 | 0 |
| AFTER 4 DAYS AT 20° C. | 20 | 0 | 0 | 100 |
| AFTER 7 DAYS AT 20° C. | 100 | 60 | 0 | 100 |
| AFTER 3 DAYS AT 50° C. | 100 | 100 | 100 | 100 |
| AFTER IMMERSION FOR 7 DAYS AT 80° C. | 100 | 100 | 100 | 0 |
| AFTER IMMERSION FOR 14 DAYS AT 80° C. | 100 | 100 | 100 | 0 |

The room temperature-curable composition of Example 5 (composition of the present invention) exhibited 100% cohesive failure after cure for 7 days at 20° C., but Comparison Example 3 which contained the isopropyl ester of abietic acid only had 60% cohesive failure and required heating to obtain 100 % cohesive failure, as did the abietic acid. The composition without either an ester of abietic acid or the abietic acid per se achieved 100% cohesive failure after 4 days at 20° C. but had 0% cohesive failure after immersion in 80° C. water.

EFFECTS OF THE INVENTION

The room-temperature-curable organopolysiloxane composition according to the present invention characteristically bonds well to substrates through contact-curing, exhibits an excellent early-cure adhesion, and after curing is highly water-resistant and exhibits long-term retention of its bonding strength even in hostile ambients e.g., immersion in hot water, because it is composed of components (A) through (E) and in particular because it contains the rosin ester of a polyol as component (C) and the aminoalkylalkoxy-silane/epoxyalkylalkoxysilane reaction mixture of component (D).

That which is claimed is:

1. A room-temperature-curable organopolysiloxane composition comprising
   (A) 100 parts by weight of hydroxyl-endblocked or alkoxy-endblocked organopolysiloxane that has a viscosity at 25° C. within the range of 0.000020 to 1 m²/s,
   (B) 1 to 300 parts by weight-inorganic filler,
   (C) 0.1 to 10 parts by weight rosin ester which is an esterification product of rosin and a polyol,
   (D) 0.5 to 30 parts by weight reaction mixture from aminoalkylalkoxysilane and epoxyalkylalkoxysilane, and
   (E) 0.001 to 10 weight parts curing catalyst.

2. The room-temperature-curable organopolysiloxane composition according to claim 1 in which the rosin ester of (C) is an esterification product of rosin and ethylene glycol.

3. The room-temperature-curable organopolysiloxane composition according to claim 1 in which the rosin ester of (C) is an esterification product of rosin and glycerol.

4. The room-temperature-curable organopolysiloxane composition according to claim 1 in which the rosin ester of (C) is an esterification product of rosin and pentaerythritol.

5. The room-temperature-curable organopolysiloxane composition according to claim 1 in which the viscosity of the organopolysiloxane of (A) is 0.0001 to 0.1 m²/s.

6. The room-temperature-curable organopolysiloxane composition according to claim 2 in which the viscosity of the organopolysiloxane of (A) is 0.0001 to 0.1 m²/s.

7. The room-temperature-curable organopolysiloxane composition according to claim 3 in which the viscosity of the organopolysiloxane of (A) is 0.0001 to 0.1 m²/s.

8. The room-temperature-curable organopolysiloxane composition according to claim 1 further comprising (F) an alkoxysilane crosslinker.

9. The room-temperature-curable organopolysiloxane composition according to claim 2 further comprising (F) an alkoxysilane crosslinker.

10. The room-temperature-curable organopolysiloxane composition according to claim 3 further comprising (F) an alkoxysilane crosslinker.

11. The room-temperature-curable organopolysiloxane composition according to claim 4 further comprising (F) an alkoxysilane crosslinker.

12. The room-temperature-curable organopolysiloxane composition according to claim 5 further comprising (F) an alkoxysilane crosslinker.

13. The room-temperature-curable organopolysiloxane composition according to claim 6 further comprising (F) an alkoxysilane crosslinker.

14. The room-temperature-curable organopolysiloxane composition according to claim 7 further comprising (F) an alkoxysilane crosslinker.

15. The room-temperature-curable organopolysiloxane composition according to claim 1 in which the organopolysiloxane of (A) is a hydroxyl-endblocked polydimethylsiloxane, the inorganic filler of (B) is calcium stearate treated calcium carbonate, the rosin ester of (C) is present in an amount of from 0.5 to 5 parts by weight, the reaction mixture of (D) is present in an amount of from 1 to 10 parts by weight and is from gamma-aminopropyltriethoxysilane and gamma-glycidoxypropyltrimethoxysilane in a molar ratio of 1:1.5 to 1:5 respectfully, and the curing catalyst of (E) is present in an amount of 0.01 to 5 parts by weight and is dibutyl tin dilaurate.

16. The room-temperature-curable organopolysiloxane composition according to claim 2 in which the organopolysiloxane of (A) is a hydroxyl-endblocked polydimethylsiloxane, the inorganic filler of (B) is calcium stearate treated calcium carbonate, the rosin ester of (C) is present in an amount of from 0.5 to 5 parts by weight, the reaction mixture of (D) is present in an amount of from 1 to 10 parts by weight and is from gamma-aminopropyltriethoxysilane and gamma-glycidoxypropyltrimethoxysilane in a molar ratio of 1:1.5 to 1:5 respectfully, and the curing catalyst of (E) is present in an amount of 0.01 to 5 parts by weight and is dibutyl tin dilaurate.

17. The room-temperature-curable organopolysiloxane composition according to claim 3 in which the organopolysiloxane of (A) is a hydroxyl-endblocked polydimethylsiloxane, the inorganic filler of (B) is calcium stearate treated calcium carbonate, the rosin ester of (C) is present in an amount of from 0.5 to 5 parts by weight, the reaction mixture of (D) is present in an amount of from 1 to 10 parts by weight and is from gamma-aminopropyltriethoxysilane and gamma-glycidoxypropyltrimethoxysilane in a molar ratio of 1:1.5 to 1:5 respectfully, and the curing catalyst of (E) is present in an amount of 0.01 to 5 parts by weight and is dibutyl tin dilaurate.

18. The room-temperature-curable organopolysiloxane composition according to claim 8 in which the organopolysiloxane of (A) is a hydroxyl-endblocked polydimethylsiloxane, the inorganic filler of (B) is calcium stearate treated calcium carbonate, the rosin ester of (C) is present in an amount of from 0.5 to 5 parts by weight, the reaction mixture of (D) is present in an amount of from 1 to 10 parts by weight and is from gamma-aminopropyltriethoxysilane and gamma-glycidoxypropyltrimethoxysilane in a molar ratio of 1:1.5 to 1:5 respectfully, the curing catalyst (E) is present in an amount of 0.01 to 5 parts by weight and is dibutyl tin dilaurate, and (F) is present in an amount of from 1 to 10 parts by weight and is n-propyl orthosilicate.

19. The room-temperature-curable organopolysiloxane composition according to claim 9 in which the organopolysiloxane of (A) is a hydroxyl-endblocked polydimethylsiloxane, the inorganic filler of (B) is calcium stearate treated calcium carbonate, the rosin ester of (C) is present in an amount of from 0.5 to 5 parts by weight, the reaction mixture of (D) is present in an amount of from 1 to 10 parts by weight and is from gamma-aminopropyltriethoxysilane and gamma-glycidoxypropyltrimethoxysilane in a molar ratio of 1:1.5 to 1:5 respectfully, the curing catalyst (E) is present in an amount of 0.01 to 5 parts by weight and is dibutyl tin dilaurate, and (F) is present in an amount of from 1 to 10 parts by weight and is n-propyl orthosilicate.

20. The room-temperature-curable organopolysiloxane composition according to claim 10 in which the organopolysiloxane of (A) is a hydroxyl-endblocked polydimethylsiloxane, the inorganic filler of (B) is calcium stearate treated calcium carbonate, the rosin ester of (C) is present in an amount of from 0.5 to 5 parts by weight, the reaction mixture of (D) is present in an amount of from 1 to 10 parts by weight and is from gamma-aminopropyltriethoxysilane and gamma-glycidoxypropyltrimethoxysilane in a molar ratio of 1:1.5 to 1:5 respectfully, the curing catalyst (E) is present in an amount of 0.01 to 5 parts by weight and is dibutyl tin dilaurate, and (F) is present in an amount of from 1 to 10 parts by weight and is n-propyl orthosilicate.

* * * * *